H. O. CHUTE.
PROCESS OF MAKING ACETATES.
APPLICATION FILED MAR. 31, 1906.
939,980.
Patented Nov. 16, 1909.
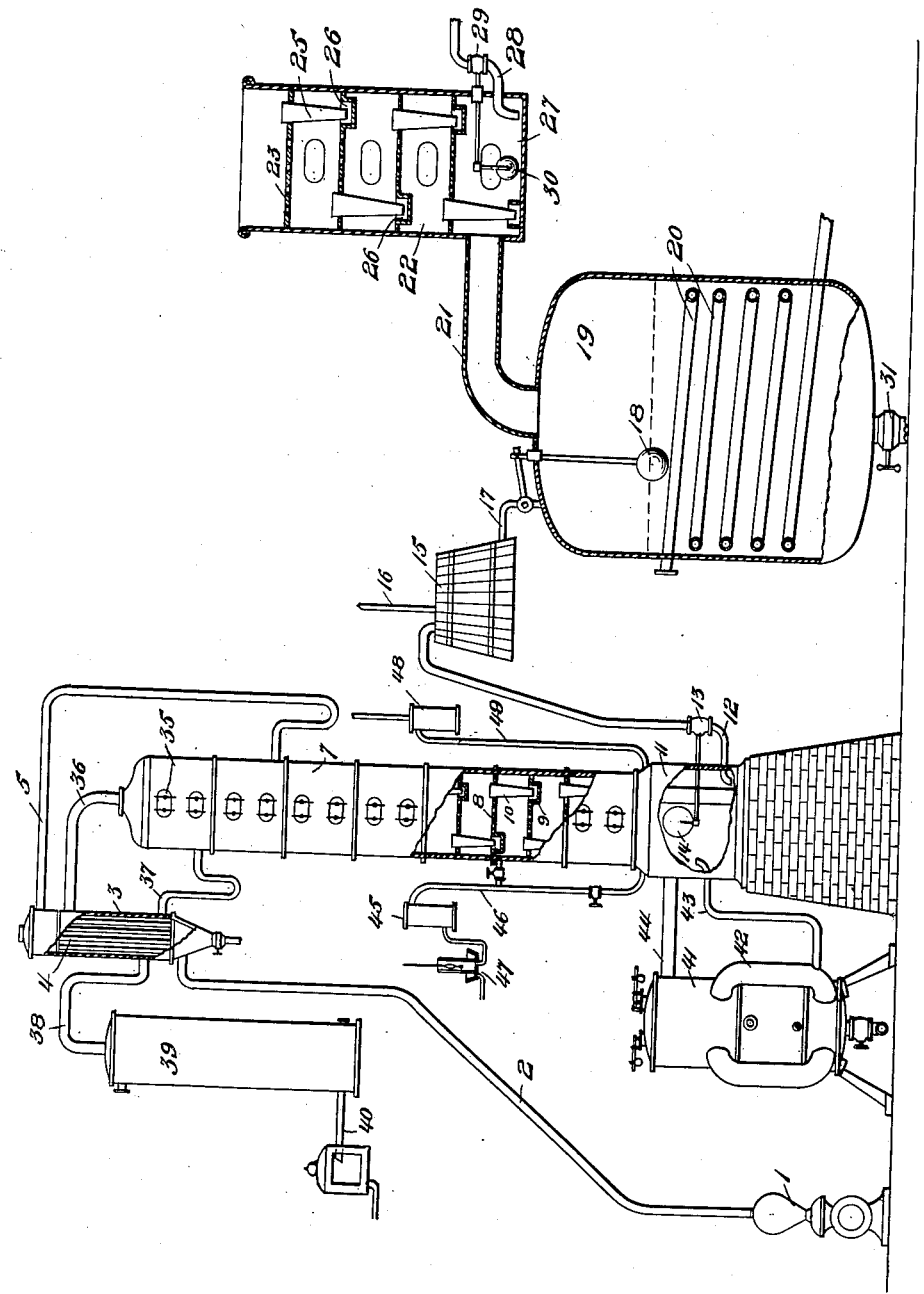
Witnesses
Inventor
H. O. Chute
By Marble & McElroy
Attorney

UNITED STATES PATENT OFFICE.

HARRY O. CHUTE, OF CLEVELAND, OHIO.

PROCESS OF MAKING ACETATES.

939,980.   Specification of Letters Patent.   Patented Nov. 16, 1909.

Application filed March 31, 1906. Serial No. 309,114.

*To all whom it may concern:*

Be it known that I, HARRY O. CHUTE, a citizen of the United States, residing in Cleveland, county of Cuyahoga, and State of Ohio, have invented certain new and useful Improvements in Processes of Making Acetates; and I hereby declare the following to be a full, clear, and exact description of the same, such as will enable others skilled in the art to which it appertains to practice and use the same.

This invention relates to the manufacture of acetates, and consists in a method of making acetates of relatively high purity from crude pyroligneous acid by certain distillatory and other steps; all as more fully hereinafter set forth, matters of novelty being particularly pointed out in the appended claims.

Pyroligneous acid is the aqueous portion of the distillate from the destructive distillation of wood, separated mechanically as far as possible from insoluble bodies, as tar, etc. It is a dark clear wine-colored liquid with a rank odor and unpleasant taste, consisting of a solution in water of acetic acid, methyl alcohol, acetone, etc., and contaminated by tar, oily bodies, aldehydes, amins, higher ketones, etc., held in solution and suspension by the solvent action of the acid and the spirituous bodies. It has long been a problem in the art to prepare reasonably pure acetic acid and acetates from this liquid without expensive manipulation, and it is the object of the present invention to provide a method for this purpose. Pyroligneous acid is practically useless as such owing to its unpleasant characteristics, and though it may be freed from part of its impurities, such as tar, by distillation, certain other impurities are volatile in acid solution, and on addition of alkali these contaminate the acetate produced from distilled acid.

In the manufacture of acetates of the higher grades, of which the calcium salt of at least 82 per cent. purity is the most common being known in the trade as "gray acetate", or as "graukalk", it is customary to feed the crude pyroligneous acid continuously into a copper pot still and distil off everything volatile and occasionally draw off the accumulated tar in the bottom of the still. The weak watery distillate is neutralized with lime and evaporated to dryness. This distillation leaves most of the tarry bodies behind but carries forward to mix with the acid all the impurities volatile with steam or from acid solution. On neutralization of this distillate, it gives "gray acetate" which rarely contains more than 82 per cent. of real acetate, in the case of the lime salt. These impurities are of two classes, the first of which are of an oily nature and insoluble in the first runnings of distillate while the other impurities are unstable bodies, such as aldehydes and higher ketones, which are soluble in water and wood alcohol but form condensation products with excess of alkalies. These volatile impurities while mostly boiling at temperatures greater than that of water, nevertheless in these processes distil with the acid and wood spirit, obeying in this respect the laws of mixed fluids.

In the stated processes of the older art, the distillation has been of the whole acid fluid, or of the neutralized fluid. This I have found to be irrational, and my invention consists partly in a regulated distillation of the acid whereby these volatile impurities may be removed in a concentrated form. While as stated, they are volatile with the acid solution as a whole, I find that they are particularly so with the concentrated vapors of the spirituous constituents, the alcohol and acetone and their homologues; with the bodies which together form "wood alcohol." By conducting the heating of the pyroligneous acid in such manner that substantially all the wood spirit is removed in concentrated form with as little of the water and of the acid as possible, I find that the great bulk of these volatile impurities go into the distillate. In other words, by fractionating out the wood alcohol in as concentrated a form as possible in this first distillation I remove with it these volatile impurities, leaving behind a pyroligneous acid of much purer nature.

Though the oily impurities go over with the alcohol, as stated, in methodical work they do not injure it as in certain concentrations they are practically insoluble, causing the alcohol to appear milky and on standing forming droplets in the wood spirit, and they can readily be separated by settling. This process of making pure wood spirit however I do not herein claim, it forming the subject matter of a separate co-pending application, upon which I have been granted Patent No. 824,906 July 3, 1906.

Fractionation of the desired type may be readily effected in any of the commercial devices giving rich distillates, such as column stills, or other stills giving a return-flow of high boiling liquid, and delivering a concentrated condensate of the low-boiling liquids.

In the process forming the present preferred embodiment of my invention, I subject the crude pyroligneous acid to treatment in any return-flow rectifying still to obtain a wood spirit as concentrated and as free from water and acid as possible, simultaneously of course obtaining an unconcentrated purified acid which is as nearly as dilute as was the original acid. The residuum is a purified pyroligneous acid, now containing only the tar and non-volatile impurities, and it may be converted into a brown acetate richer in real acetate than any now on the market. When further purification is desired, I directly distil the whole mass of residual fluid, thereby obtaining a clear and transparent acid free of tar and non-volatile impurities, as well as free of the volatile impurities removed in the fractionation. This acid is suitable for use as such for many purposes, or it may be neutralized to obtain a pure gray acetate. When this purified acetate is sought, however, I preferably combine its manufacture with the distillation, thereby economizing in heat and labor. For this purpose I conduct the vapors of the boiling liquid, previously purified from volatile impurities as described, through or over a base, maintained at a temperature above the boiling point of water, but below that of the saturated solution of the particular acetate formed. The base then absorbs the acid from the vapors, while permitting steam to go on and the acetate formed passes off in the form of a saturated solution which may be handled with much less expense than if the whole volume of vapors had been condensed, the base added and then the water evaporated off. Having the water in the form of steam in the distillation, it is obvious that it is uneconomical to condense it and then reëvaporate.

The neutralization is preferably performed in a methodical manner, the acid vapors being introduced into a conduit or receptacle at the one end while alkali is introduced at the other. The excess of steam is allowed to escape uncondensed from the end of the conduit at which the alkali is introduced, while concentrated acetate solution is removed from the end at which the acid vapors are introduced.

The base in this process may be any one desired, it depending on the acetate which is to be formed. Soda, lime, potash and oxid of lead, or their carbonates, are all suitable.

In the accompanying illustration I show, more or less diagrammatically, one form of apparatus of the many adapted to perform my process.

In this illustration—1 is an acid pump delivering pyroligneous acid through pipe 2 to a pre-heater 3, containing a nest of tubes 4, through which it flows. Leaving the pre-heater through pipe 5, the acid enters the upper portion of distilling column 7, provided with perforated shelves 8, cups 9 and downtake tubes 10, and travels downward in a well-understood way until it enters the lower chamber 11. This chamber is provided with an exit pipe 12, valved at 13 and provided with a float 14 regulating the valve. Through this pipe it flows to equalizing chamber 15, provided with a vent-pipe 16.

Returning to the description of the still, this is provided with man-holes 35 through which the cups and downtake tubes can be cleaned or removed, if made removable, this structure being necessary for the reason that tar is liable to accumulate in these elements. The wood alcohol vapors formed in this still leave through pipe 36, pass around the tubes of the pre-heater, where a portion of the water is condensed out under the influence of the inflowing cold, or relatively cold, acid, and is returned to the still through the goose-neck 37 for retreatment, since it of course carries more or less of the alcohol. The uncondensed vapors leave the pre-heater through pipe 38, are condensed in the condenser 39 and exit through pipe 40.

The heat necessary for running the still is furnished in a separate boiler 41, heated by steam passing around a nest of internal tubes (not shown). The necessary circulation of this heater instead of being furnished by a large central tube, as in ordinary evaporators, is furnished by external, air-cooled tubes 42. Tar-free liquor is drawn off from near the surface of the liquid in the bottom chamber of the still by means of a pipe 43, boiled in the heater and the vapors returned to said chamber by means of pipe 44.

In order to follow the progress of the distillation in the still, I provide it with a testing device consisting of a condenser 45 communicating with the still at various points (two are shown) by means of a valved pipe connection 46. The condensate from this passes into a hydrometer jar 47. The pressure in the still may be estimated by the manometric device 48 connected with the steam space of the bottom chamber by means of pipe 49. Pressure and temperature, of course, correspond. The pressure in the still is sufficient to force liquid into the equalizing tank (15).

In the operation of the column still (7), the liquid drawn off from the bottom chamber, 11, of the column is boiled in boiler 41, and the vapors, which are free of spirit, return through pipe 44 into said chamber and thence upward through the column against the descending acid, distilling the spirit and the low boiling bodies therefrom in the well-understood way. The inflowing liquid from 5 is delivered at a point in the column where the average contents in spirit and acid of the liquid under treatment in the column is about the same as its own contents in those substances.

The purified pyroligneous acid delivered into tank 15 is fed automatically through the pipe 17, regulated by the float controlled valve mechanism 18 keeping the still 19 filled to an approximately constant height. This method of operation causes the outflowing vapors to contain acid and water in the same relative proportions as the inflowing liquid acid. The heating coils 20 distil the acid and water through the neck 21 into the saturator 22, the vapors passing through the perforated plates 23 and coming into contact with alkali which neutralizes the acid, and the water vapor passes freely into the atmosphere at the top of the saturator which is left open for that purpose. The alkali, as lump lime, for instance, is placed on the top plate of the saturator and kept constantly replenished as it dissolves under the action of the passing steam and acid. Quicklime hydrates and breaks down into milk of lime which flows downward through the saturator in the opposite direction to the upward flow of acid vapors, reaching the base of the saturator as a saturated solution of acetate. The solution is held on the perforations by the pressure of steam passing through, but when the liquid on the plates reaches the level of the down pipes 25, the liquid passes down and is trapped in the cups 26, overflowing on the plate. It so passes to the bottom chamber 27 and escapes constantly by the pipe 28, regulated by the valve 29 and float 30, the rising of the liquor in the bottom chamber raising the float and opening the valve 29. The non-volatile impurities are drawn off from the still intermittently by the tar gate 31.

By using lime as the neutralizing alkali in the hot neutralizing method described and replenishing the supply with quicklime the heat of slaking and neutralization suffices to keep the temperature of the neutralizing apparatus at the required point. Using other alkalies, ordinarily a supply of heat from some extraneous source, may be required. With quicklime placed upon the upper shelf 23 of the neutralizer shown, sufficient water will be condensed from the flow of steam to form milk of lime which passes downward through the various shelves becoming more and more neutralized as it progresses until finally a concentrated solution of neutral acetate is drawn off through 28.

To recapitulate: My process in its present preferred form consists in purifying pyroligneous acid by distilling off volatile, alkali - sensitive impurities,—impurities comprising aldehydes, ketones, oily bodies and creosotes; in distilling off from the purified pyroligneous acid the acetic acid with the water; in passing these vapors through a counter current of alkali in solution or suspension at a temperature at which water vapors will not condense, allowing them to escape into the air while neutralizing the acid vapors with the alkali, and in withdrawing the concentrated acetate so produced.

What I claim is:

1. In the manufacture of acetates, the process which consists in fractionating out concentrated wood alcohol and accompanying volatile impurities from pyroligneous acid, distilling the residual acid and saturating the acid in the vapors with a base at a temperature above the boiling point of water.

2. In the manufacture of acetates, the process which consists in fractionating out concentrated wood spirit and accompanying volatile impurities from pyroligneous acid, distilling the residual acid and saturating the acid in the vapors with lime at a temperature above the boiling point of water.

3. In the manufacture of acetates, the process which comprises fractionating away concentrated wood spirit and accompanying impurities from pyroligneous acid to produce a purified substantially unconcentrated acid, distilling such acid as a whole and passing the vapors to exit through a conduit maintained above the boiling point of water, alkali being fed into the vapor exit end of such conduit and acetate solution removed from the vapor inlet end.

4. In the manufacture of acetates, the process which consists in fractionating concentrated wood alcohol and accompanying impurities from pyroligneous acid, distilling the purified acid, and neutralizing the acid in the vapors by passing said vapors past a stream of lime and water flowing in the opposed direction, replenishing said lime stream with quicklime whereby a water-boiling heat is generated.

5. In the manufacture of acetates, the sub-process which consists in boiling dilute acetic acid and passing the evolved vapors past a body of alkali maintained at a temperature above the boiling point of water.

6. In the manufacture of acetates, the process which consists in fractionating concentrated wood spirit and accompanying impurities from pyroligneous acid continuously supplying the purified acid to a still in the same amount as acid vapors distil therefrom, whereby the richness of inflowing liquid and outflowing vapors is rendered substantially the same, and passing such outflowing acid vapors past a body of alkali maintained at a temperature somewhat above the boiling point of water, whereby a concentrated solution of acetate is formed.

In testimony whereof, I affix my signature in the presence of two witnesses.

HARRY O. CHUTE.

Witnesses:
BLANCHE L. CHADWELL,
K. P. McELROY.